United States Patent [19]

Smemo

[11] 3,901,340

[45] Aug. 26, 1975

[54] STEERING BY DRIVING CONTROL LINKAGE

[75] Inventor: Alfred Sigmund Smemo, Dubuque, Iowa

[73] Assignee: Deere & Company, Moline, Ill.

[22] Filed: May 1, 1974

[21] Appl. No.: 465,991

[52] U.S. Cl. .................. 180/6.48; 74/470; 74/474
[51] Int. Cl.² ......................................... B62D 11/04
[58] Field of Search................ 180/6.48, 6.3, 77 H; 74/470, 474, 484, 483 R, 512

[56] References Cited
UNITED STATES PATENTS

| | | | |
|---|---|---|---|
| 3,121,344 | 2/1964 | Fodrea................................ | 74/484 |
| 3,270,826 | 9/1966 | Middlesworth et al........... | 180/6.48 |
| 3,540,220 | 11/1970 | Lauck................................ | 180/6.48 |
| 3,635,365 | 1/1972 | Bauer................................ | 180/6.48 X |

*Primary Examiner*—David Schonberg
*Assistant Examiner*—John A. Pekar

[57] ABSTRACT

A vehicle, such as a crawler tractor or the like, includes separate reversible hydrostatic transmission units which are adapted for driving the tracks of the tractor. The transmission units are controlled through means including a valve assembly actuated by a first manually operable linkage for simultaneously effecting changes in the speed and direction of rotation of the units, and through means of a pair of second manually operable linkages for in effect overriding the transmission condition selected by the first manually operable linkage by selectively retarding the speed of and for even changing the direction of rotation of the transmission units for effecting steering of the vehicle.

6 Claims, 7 Drawing Figures

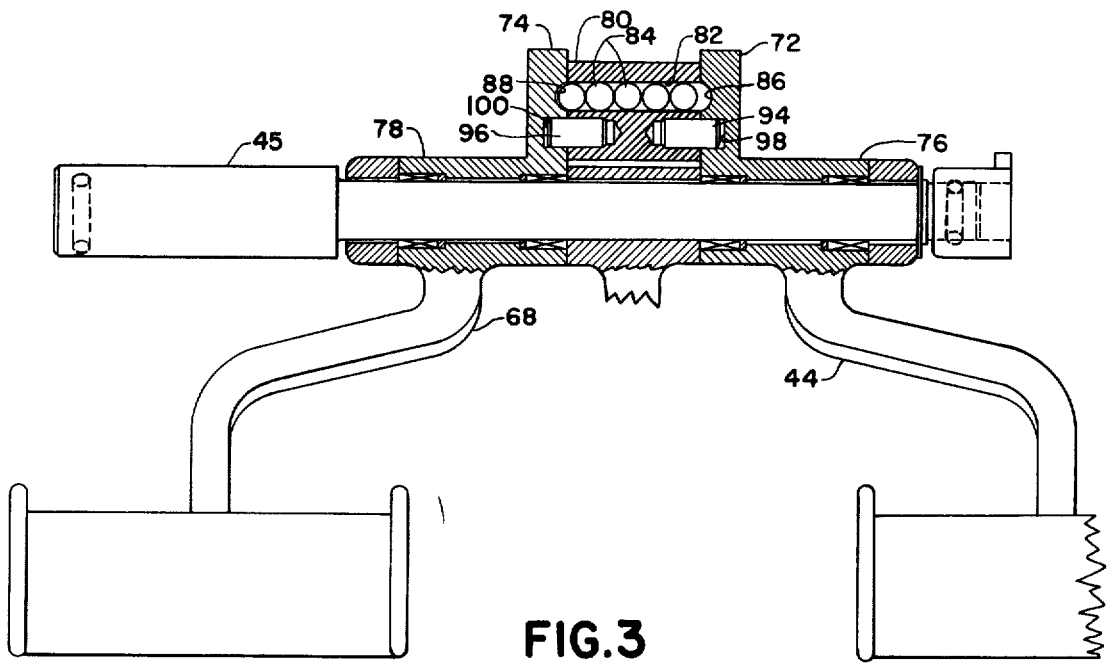
FIG.3
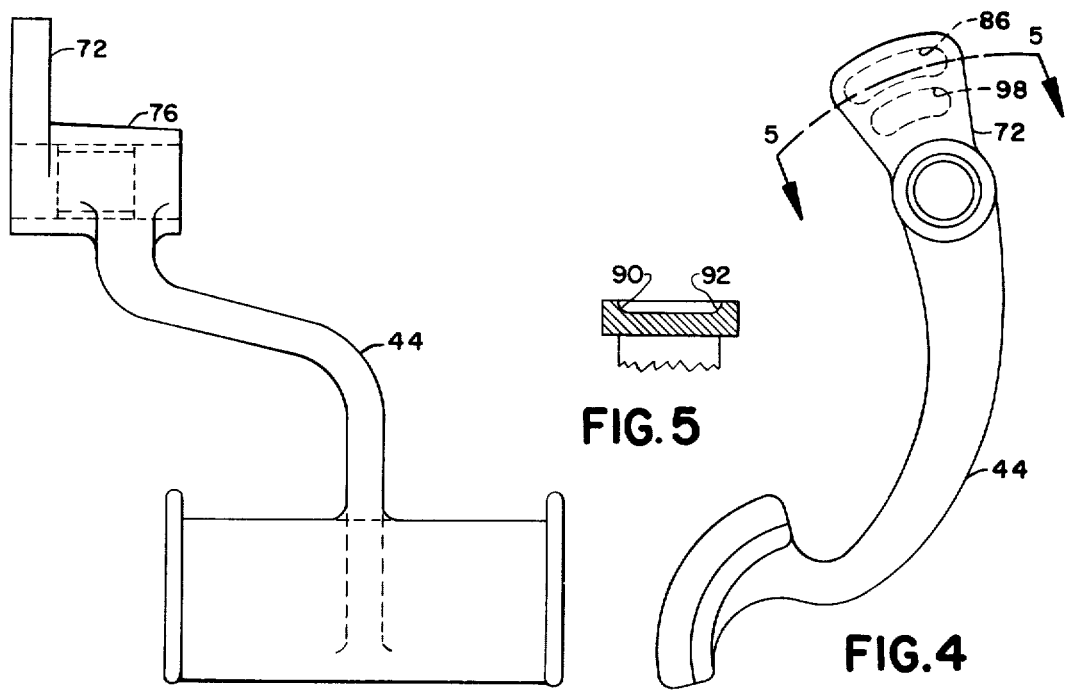
FIG.5
FIG.6
FIG.4

3,901,340

STEERING BY DRIVING CONTROL LINKAGE

BACKGROUND OF THE INVENTION

The present invention relates to a transmission valve control linkage and more particularly relates to a manually actuatable linkage means for selectively retarding the speed of and for even changing the direction of rotation of a pair of reversible hydrostatic transmission units comprising final drive transmissions of a tracklaying vehicle.

In a track-laying vehicle having separate hydrostatic transmission units for driving the tracks thereof, steering is often accomplished by driving. That is to say that steering is accomplished by controlling the operation of the transmission units. Conventionally, this control of the transmission units involves a valve means having separate valve elements which are manually actuatable to selectively retard the speed of one or the other of the transmission units to in effect override a speed condition of the unit previously selected through means of a transmission shift lever. The sharpness of the turn is generally directly proportional to the amount of movement which is imparted to the valve element in displacing the latter from a neutral position wherein it has no effect on the preselected driving speed of the transmission units. Heretofore, the correct positioning of the separate valve elements so as to effect the desired steering has required visual attention of the operator and this requirement for visual attention is not entirely satisfactory, since the operator normally has other operations which also require his visual attention.

SUMMARY OF THE INVENTION

According to the present invention, there is provided a novel manual control linkage means for controlling valve means for in turn controlling the operation of a pair of reversible hydrostatic transmission units.

It is a broad object of the invention to provide manually operable linkage means for actuating a valve means for selectively retarding the speed of and for even changing the direction of rotation of a pair of hydrostatic transmission units so as to effect a steering operation of a vehicle in which the units are embodied as final drive units, the linkage means including means by which it is possible to effect a desired condition in the units without necessitating the visual attention of the operator. More specifically, it is an object of the invention to provide such a linkage means which includes variable resistance means which requires increasing operator effort to effect increasing retardation or slowing of a transmission unit.

Still more specifically, it is an object to provide variable resistance means, as aforedescribed, which develop a substantial step increase in resistance when the linkage means has been moved to a position corresponding to a position where the valve means will cause a change in rotation in the transmission unit whereby the operator is apprised of the condition without the need of his visual attention being directed thereto.

Another object is to provide a linkage means including similar right and left sets of manually operable linkages which are interlocked so as to prevent the operator from causing a simultaneous reversal of the direction of rotation of both transmission units.

These and other objects of the invention will become apparent from a reading of the following description in conjunction with the appended drawings.

BRIEF DESCRIPTION OF THE DRAWINGS

FIG. 3 is a view partially in section showing the means for interlocking a pair of control pedals respectively associated with the sets of control linkages.

FIG. 4 is a right end view of the control pedal shown in FIG. 3.

FIG. 5 is a sectional view taken along the line 5—5 of FIG. 4.

FIG. 6 is a front elevational view of the right control pedal.

FIG. 7 is a side elevational view (rotated through 90° of a hand lever option which may be used in lieu of the foot pedal linkage.

DESCRIPTION OF THE PREFERRED EMBODIMENT

Figure 1:
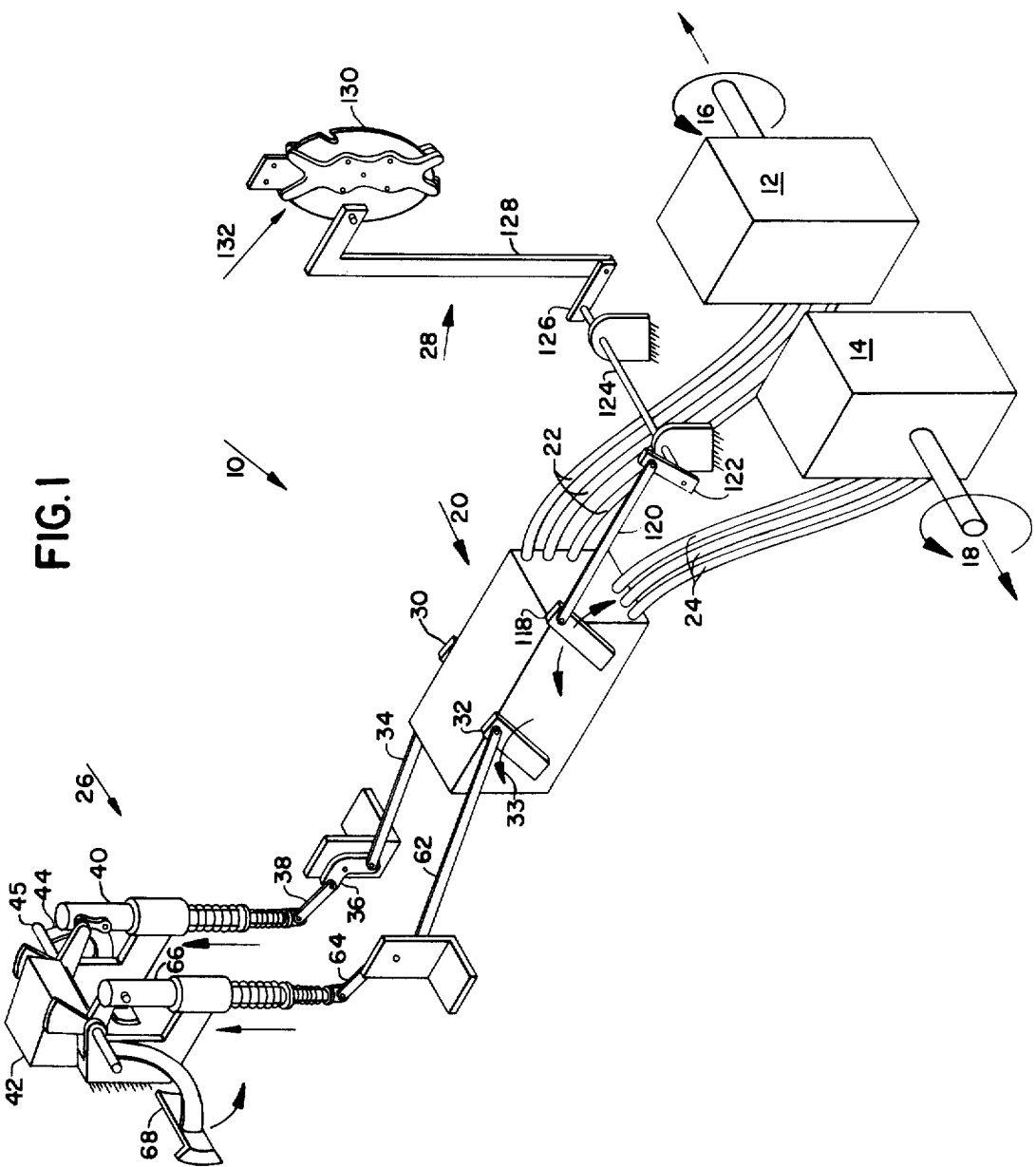
FIG. 1 is a perspective schematic representation of the control system embodying a manual control linkage means constructed according to the principles of the present invention.

Referring now to FIG. 1, a control system embodying the present invention is indicated in its entirety by the reference numeral 10. The system 10 includes right and left hydrostatic transmission units 12 and 14, respectively, including right and left output shafts 16 and 18 which are adapted for connection to track drive sprockets of the vehicle (not shown). Working fluid for driving the transmission units 12 and 14 is routed thereto through means of a control valve 20 connected to the units 12 and 14 through means of right and left sets of fluid lines 22 and 24, each set of fluid lines including two lines which are alternately selectively connected to a source of fluid pressure and a reservoir through means of the valve and a third line which is connected to a respective crankcase (not shown) of the transmission units 12 and 14 so as to drain fluid therefrom. For the purpose of selectively actuating the valve 20 for controlling the routing of working and return fluid to and from the transmission units 12 and 14, there is provided steering controls, indicated generally at 26, and speed and direction controls, indicated generally at 28.

Figure 2:
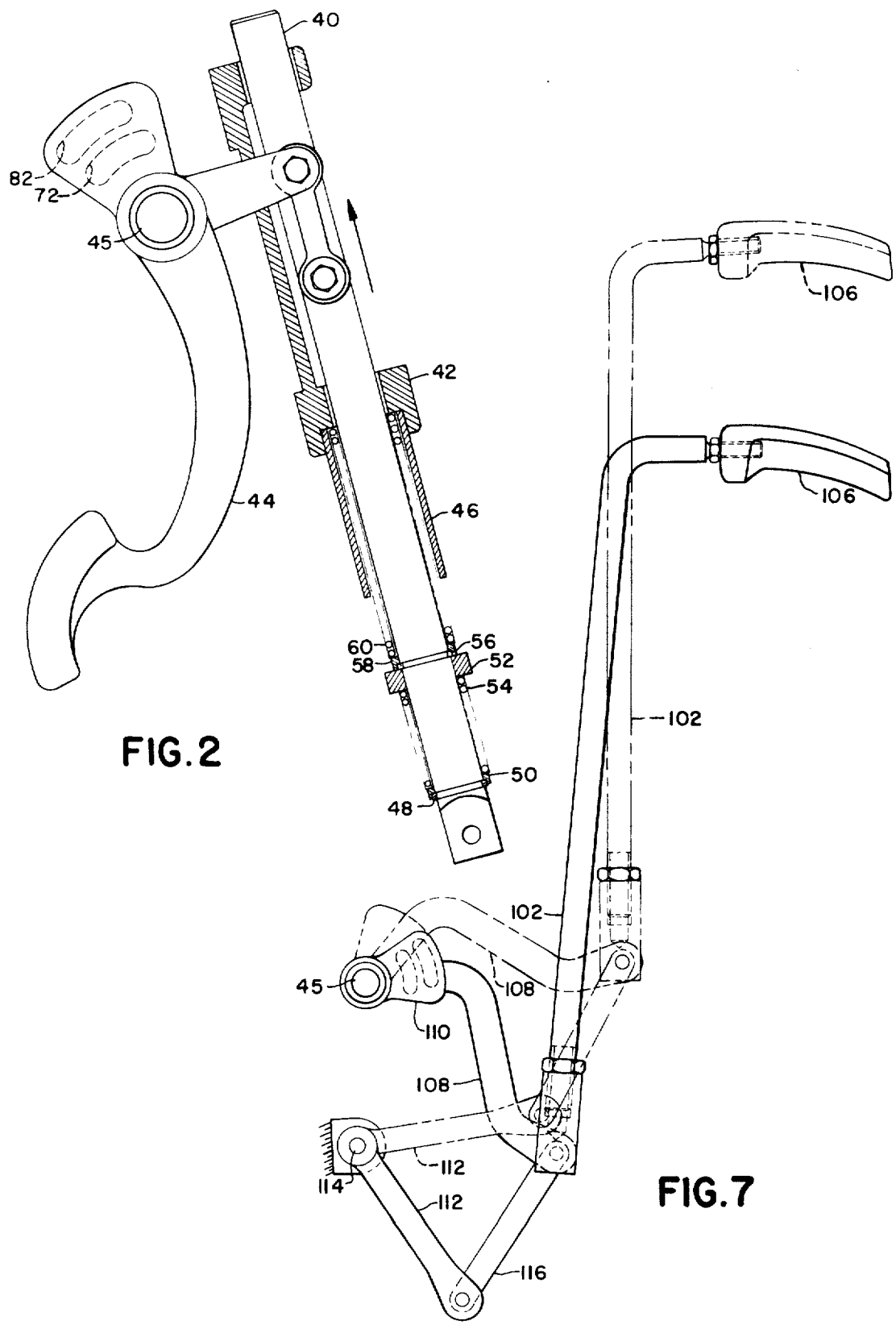
FIG. 2 is a side elevational view partially in longitudinal section of a part of one set of the control linkages.

Steering of the vehicle is accomplished by retarding or slowing one or the other of the hydrostatic transmission units 12 and 14. For example, to make a right turn, the right unit 12 would be slowed and to make a left turn, the left unit 14 would be slowed. To accomplish this selective slowing of the hydrostatic motor units 12 and 14, the control valve 20 includes right and left valve elements (not shown) respectively having right and left control arms 30 and 32 connected thereto for rotating the same upon pivotal movement of the arms. The steering controls 26 include similar right and left sets of linkages for respectively displacing the arms 30 and 32 angularly in the direction of the arrow 33 from normal neutral conditions illustrated in FIG. 1. Specifically, the right set of linkages includes a link 34 having its opposite ends connected to the right arm 30 and one leg of a bell crank 36. One end of a short link 38 is pivotally connected to the other leg of the bell crank 36 and, the other end of the link 38 is pivotally connected to the bottom end of a rod 40 which is reciprocally mounted in a fixed member 42. A foot pedal 44 is pivotally mounted on a transverse shaft 45 and has a forwardly projecting arm linked to the rod 40 at a location adjacent the top end of the rod. As can best be seen in FIG. 2, the fixed member 42 has a right sleeve member 46 mounted thereon in concentric relationship to the rod 40. Mounted on the rod 40 adjacent the lower thereof is a snap ring 48 which prevents a collar 50 from sliding off the bottom end of the rod 40. Compressed between the collar 50 and a further collar 52 is a coil compression spring 54. The collar 52 is prevented from sliding upwardly on the rod 40 through means of a snap ring 56 which also serves to prevent downward movement of still another collar 58 mounted on the rod 40. Compressed between the collar 58 and the fixed member 42 is a second coil compression spring 60 having its upper portion located within the sleeve member 46.

Thus, it will be appreciated that when the rod 40 is shifted upwardly, the spring 60 will be compressed more and more as the collar 58 moves closer and closer to the support structure 42. It is to be noted that the collar 58 is dimensioned so that it can pass into the sleeve member 46 while the collar 52 is dimensioned so as to be too large to pass into the sleeve member 46. Thus, when the rod 40 has shifted upwardly a distance sufficient to bring the collar 52 into engagement with the bottom of the sleeve member 46 further upward movement of the rod 40 will cause the collar 52 to be shifted downwardly to compress the spring 54 against the lower collar 50. Since upward movement of the rod 40 is transferred to cause forward swinging movement of the valve control arm 40, it will be appreciated that the springs act to produce an ever-increasing force resisting the upward movement of the rod 40. The purpose of this is to give the operator a feel or feedback which corresponds to the amount that the speed of the transmission unit being controlled has been retarded. Further, it will be appreciated that resistance will increase more or less linearly until the collar 52 engages the bottom of the sleeve member 46 and the compression spring 54 comes into play. The stiffness of the spring 54 is so selected that a dramatic step increase in the resistance to movement to the rod 40 occurs at this point. The point at which this step increase occurs is preselected to corelate with the position of the valve control arm 30 at which the transmission unit 12 would be stalled. Further movement of the control valve arm 30 beyond the stall-inducing position will result in the direction of driving of the transmission unit 12 being reversed. Thus, the operator will know when the stall condition has occured so that he can better control the steering action of the vehicle.

The left set of steering control linkages is not disclosed in detail but includes a connecting link 62 having its opposite ends respectively pivotally connected to the left valve arm 32 and one leg of a bellcrank (not shown) similar to the bellcrank 36. A short link 64 is pivotally interconnected between the other leg of the bellcrank and the bottom end of a rod 66 which is reciprocally mounted in the fixed member 42. A foot pedal 68 is pivotally mounted on the shaft 45 and includes a forwardly projecting arm linked to the rod 60 at a location adjacent its top end.

The operation of the right and left foot pedals 44 and 68, respectively, is interlocked so as to prevent an operator from simultaneously depressing both pedal to the extent that the control valve 20 is actuated to control the transmission units 12 and 14 beyond their respective stall points. Specifically, with reference to FIGS. 3–6, it can be seen that the pedals 44 and 68 respectively include similar flanges 72 and 74 which extend radially outwardly from respective mounting portions 76 and 78 of the foot pedals that are received on the pivot shaft 45. The fixed member 42 includes a portion 80 which extends centrally between and is in engagement with opposed faces of the flanges 72 and 74. Extending transversely through the portion 80 in parallel relationship to the shaft 45 is a bore 82 containing five steel balls 84. The flanges 72 and 74 are respectively provided, at those surfaces engaged with the central portion 80 of the fixed member 42, with respective grooves 86 and 88 which are formed arcuately about the axis of the shaft 45 at respective radii equal to the distance of the bore 82 from the shaft axis. The grooves 86 and 88 are shaped complementary of the balls 84 and the opposite ends of each of the grooves respectively form inwardly inclined ramps, only ramps 90 and 92 of the groove 86 of the flange 72 being shown in FIG. 5. As can best be seen in FIG. 3, the row of steel balls 84 when engaged with each other has a transverse dimension chosen such that when one of the end balls is received in one of the grooves 86 or 88, the other of the end balls will be free from engagement with the other of the grooves 86 and 88. The lengths of the grooves 86 and 88 are chosen such that upon simultaneous actuation of the right and left foot pedals 44 and 68, respectively, corresponding ramps at the ends of the grooves 86 and 88 will act on the opposite ends of the row of balls 84 so as to prevent the pedals from being rotated beyond that position which corresponds to that at which the control valve 20 is actuated to effect a stall condition in the transmission units 12 and 14, these stall conditions being that to which the transmission units are controlled just prior to their being controlled so as to reverse their directions of rotation.

Located in the central portion 80 of the fixed member 42 radially inwardly of the bore 82, relative to the axis of the shaft 45, are oppositely projecting right and left stop pins 94 and 96, respectively. The stop pins 94 and 96 act to define the limits of motion of the pedals 44 and 68 and for this purpose are received in respective arcuate grooves 98 and 100 located in the flanges 72 and 74 at respective locations radially inwardly of the grooves 86 and 88. Thus, when the foot pedals 44 and 68 are disengaged, the spring 60 encircling the right rod 40 and the corresponding spring encircling the left rod 66 will act to maintain the pedals 44 and 68 in positions whereat the stop pins 94 and 96 are engaged with respective first ends of the right and left grooves 98 and 100. Upon one or the other of the foot pedals 44 and 58 being depressed, it may be rotated through an arc corresponding to the length of the grooves 98 and 100 until a respective second end engages one of the pins 94 and 96. It is to be noted that the length of the grooves 98 and 100 are so chosen relative to the grooves 86 and 88 that the pedals may be individually rotated past that position at which the steel balls 84 will prevent simultaneous rotation of the pedals.

Referring now to FIG. 7, therein is shown a hand lever option which may be used in lieu of the foot pedals 44 and 68. The right and left sides of the hand lever option are similar and only that for the right side is shown. Thus, the right side of the hand lever option includes a fore-and-aft shiftable rod 102 supported for fore-and-aft sliding movement in a control console (not shown) and has an upstanding hand grip 106 at its rearward end. The forward end of the rod 102 is pivotally connected to the upper end of a control arm 108, the latter including a bottom portion rotatably mounted on the pivot shaft 45 and including a flange 110 which is shaped similar to and performs the same function as the flange 72 of the aforedescribed right foot pedal 44. For the purpose of maintaining the rod 102 in a generally horizontal disposition as it is moved fore and aft, a guide linkage is provided which includes a first link 112 disposed forwardly of and in general parallelism to the control arm 108 and having its lower end pivoted to the vehicle frame, as at pivot 114, and having its upper end connected to the juncture of the rod 102 and the control arm 108 through means of a link 116. Thus it will be appreciated that the only part of the foot pedal-operated linkage which needs to be disturbed in order to provide hand lever-operated controls is the foot pedals themselves, they being replaced by control arms similar to the control arm 108.

The speed and direction of rotation of the right and left transmission units 12 and 14 is controlled through means of a valve element (not shown) having an arm 118 connected thereto and swingable fore and aft from a neutral position, shown in FIG. 1, for respectively effecting increasing forward and increasing rearward driving speeds in the units 12 and 14. Motion is transmitted to the arm 118 through means of a fore-and-aft extending connecting link 120 having its opposite ends respectively pivotally connected to the upper end of the arm 118 and to the upper end of a crankarm 122 fixed to the left end of a crankshaft 124 having a further crankarm 126 secured to its right end. An upwardly extending link 128 has its opposite ends respectively connected to the outer end of the crankarm 126 and to a rotatably mounted core plate 130 of a hand lever assembly including a variable resistance generating structure indicated generally at 132.

As the speed and direction control 28 forms no part of the present invention, no detailed description nor further description thereof is given.

The operation of the steering controls 26 is briefly described as follows. Assuming that the transmission units 12 and 14 are in a forward driving condition and are operating at a speed determined by the setting of the speed and direction controls 28 and that it is desired to make a right turn, the operator need only to depress the right foot pedal 44. This movement of the foot pedal 44 will immediately be transferred to the rod 40 to cause upward shifting movement of the latter. As the rod 40 moves upwardly, it will begin to compress the spring 60 and the operator will need to apply an increasing force in order to increase the displacement of the pedal 44. In addition to compressing the spring 60 upward movement of the rod 40 will be transmitted to the right valve control arm 30 to cause forward movement thereof which results in the speed of the right transmission unit 12 being retarded or slowed. Since only the speed of the right track is slowed, the vehicle will being a right turn. The sharpness of the turn will, of course depend upon how much the speed of the right transmission unit 12 has been retarded. Therefore, to make a gradual right turn, the right pedal 44 will not be depressed to the extent that the unit 12 is stalled, this movement of the pedal being that which is sufficient to bring the collar 52 up against the bottom of the sleeve member 46. Accordingly, if it is desired that the turn be quite sharp, the pedal will be depressed to bring the collar 52 up against the bottom of the sleeve member 46 and at that point, the operator will know he has reached the position where the transmission unit 12 is stalled since the collar 52 will now being to compress the spring 54 resulting in a substantial step increase in the amount of force the operator needs to exert to continue shifting the rod 40 upwardly. With the right transmission unit 12 stalled, the vehicle will turn approximately about a vertical axis extending centrally through the right track of the vehicle. If it is desired to effect still a sharper right turn, this may be done by depressing the pedals 44 still further so as to effect a reverse driving condition in the right transmission unit 12. During this movement of the pedal, the operator must overcome the added resistance to movement of the rod afforded by the spring 60 and the spring 54. Thus, it will be appreciated that the operator through the varying resistance to movement of the foot pedal 44 will know the approximate condition of the transmission unit 12 without the necessity of diverting his visual attention to apprise himself of the position of the foot pedal.

A left turn is, of course, accomplished similarly to the operator for a right turn except that the left foot pedal 68 is depressed instead of the right foot pedal 44. It is to be understood that when the transmission units 12 and 14 have been controlled to drive in reverse by the speed and direction controls 28, right and left turning movement is initiated by individual operation of the foot pedals 44 and 68 in the manner above described.

Should the operator simultaneously engage both foot pedals 44 and 68, he is prevented from depressing them beyond the point for effecting a stalled condition in the transmission units 12 and 14 by the interlock formed by the steel balls 84 and the grooves 86 and 88. Thus, when the collar 52 and the corresponding collar of the left set of linkages engages the sleeves carried by the fixed member 42, the balls 84 will act in corresponding ends of the grooves 86 and 88 to prevent further rotation of the foot pedals 44 and 46.

The operation of the hand lever option illustrated in FIG. 7 is similar to that of the foot lever operated linkage just described and no further description is thought necessary.

I claim:

1. A manually operable steering control li1 kage means for controlling a valve for selectively retarding the speed of a pair of hydrostatic transmission units comprising: a fixed support member; said linkage means including similar first and second sets of linkages; each of said sets of linkages including an elongate member reciprocally mounted in said fixed support member for movement between first and second positions for controlling a respective one of the transmission units; variable resistance means connected to said elongate member for providing a substantially constantly increasing force resisting movement of the elongate member from the first position to a predetermined third position intermediate the first and second positions and for then providing a step increase in force resisting further movement of the elongate member towards said second position and then for providing a constantly increasing force resisting movement of the elongate member as it is moved toward said second position; and the movement of each of the elongate members from the first to the third position being selected so as to effect increased slowing of a respective one of the transmission unit, the third position of the elongate member corresponding to a stalled condition in the transmission unit and movement of the elongate member from the third to the second position being selected so as to effect a reversal in the direction of rotation of the transmission unit.

2. The steering control linkage defined in claim 1 wherein said variable resistance means of each of said sets of linkages includes a first coil spring member received on a respective elongate member and having opposite ends respectively engaged with a fixed support member and a first shoulder means located on the elongate member; a second coil compression spring received on the elongate member and having opposite ends respectively engaged with a collar slidably mounted on the elongate member and with a second shoulder means located on the rod; said collar being positioned so as to abut against said first shoulder means and so as to be engaged by said fixed support member only when the elongate member is displaced from the first position a distance sufficient to place it in said third position.

3. The steering control linkage defined in claim 2 wherein said fixed support member includes a sleeve member surrounding each elongate control member; and each of said collars being dimensioned and located so as to engage the sleeve member when the associated elongate member has moved to said third position and each of said first shoulder means being dimensioned to permit passage thereof into a respective one of the sleeve members.

4. The steering control linkage defined in claim 1 wherein each of the first and second sets of linkages includes a lever member rotatably mounted for swinging about a fixed axis; each lever member being linked to a respective one of the elongate members for causing movement of the latter between its first and second positions; and interlock means interconnecting the lever members of the first and second linkages for preventing the lever members from being simultaneously swung beyond intermediate positions corresponding to the third position of the elongate member.

5. The steering control linkage defined in claim 4 wherein said lever members are mounted for rotation about the same axis and include respective flanges extending radially to the axis and having respective surfaces facing each other and disposed in sliding engagement with a portion of said fixed support member located therebetween; a bore extending through said portion of the fixed support member in substantial parallelism with said axis; locking element means disposed in and being slightly longer than said bore; arcuately arranged groove means located in each of said flanges at respective radii equal to the distance of said bore from said axis so as to receive opposite end means of said locking element means and including ramp means for shifting said locking element means away from the flange in which ramp means is located and said the length of said groove means and the disposition of said ramp means being located such that said locking element means becomes wedged between the respective ramp means of the groove means to prevent further rotation of the lever members when the latter are in positions corresponding to said third positions of the elongate members.

6. The steering control linkage defined in claim 5 wherein said locking element means is a plurality of ball members and said groove means being shaped complementary to the ball members.

* * * * *